March 31, 1925.
F. D. FOWLER
1,531,435
TREAD APPLYING MACHINE FOR SOLID TIRES
Filed Nov. 21, 1923    3 Sheets-Sheet 3
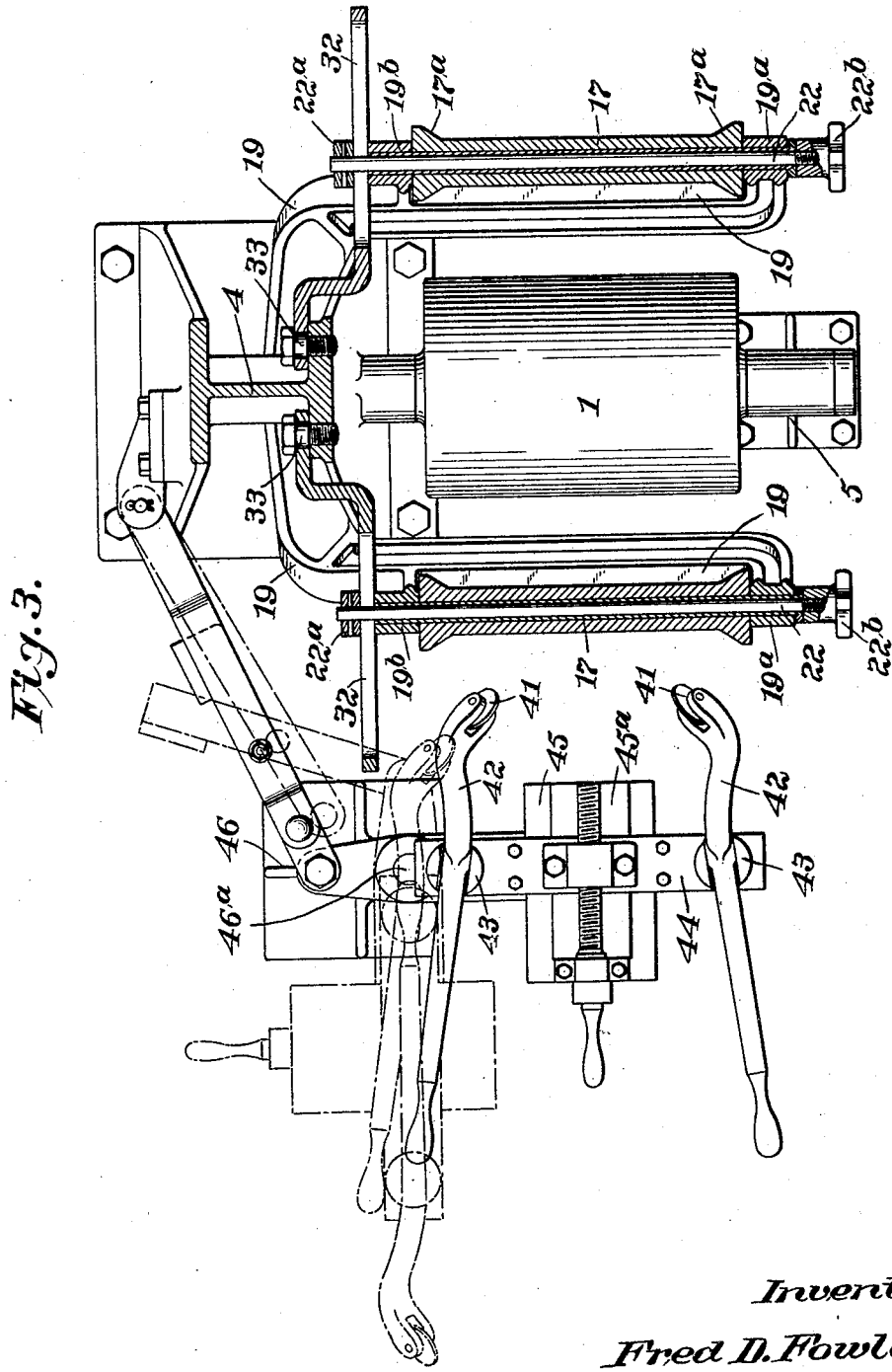
Inventor:
Fred D. Fowler,
by Spear Middleton Donaldson Hall
Attys.

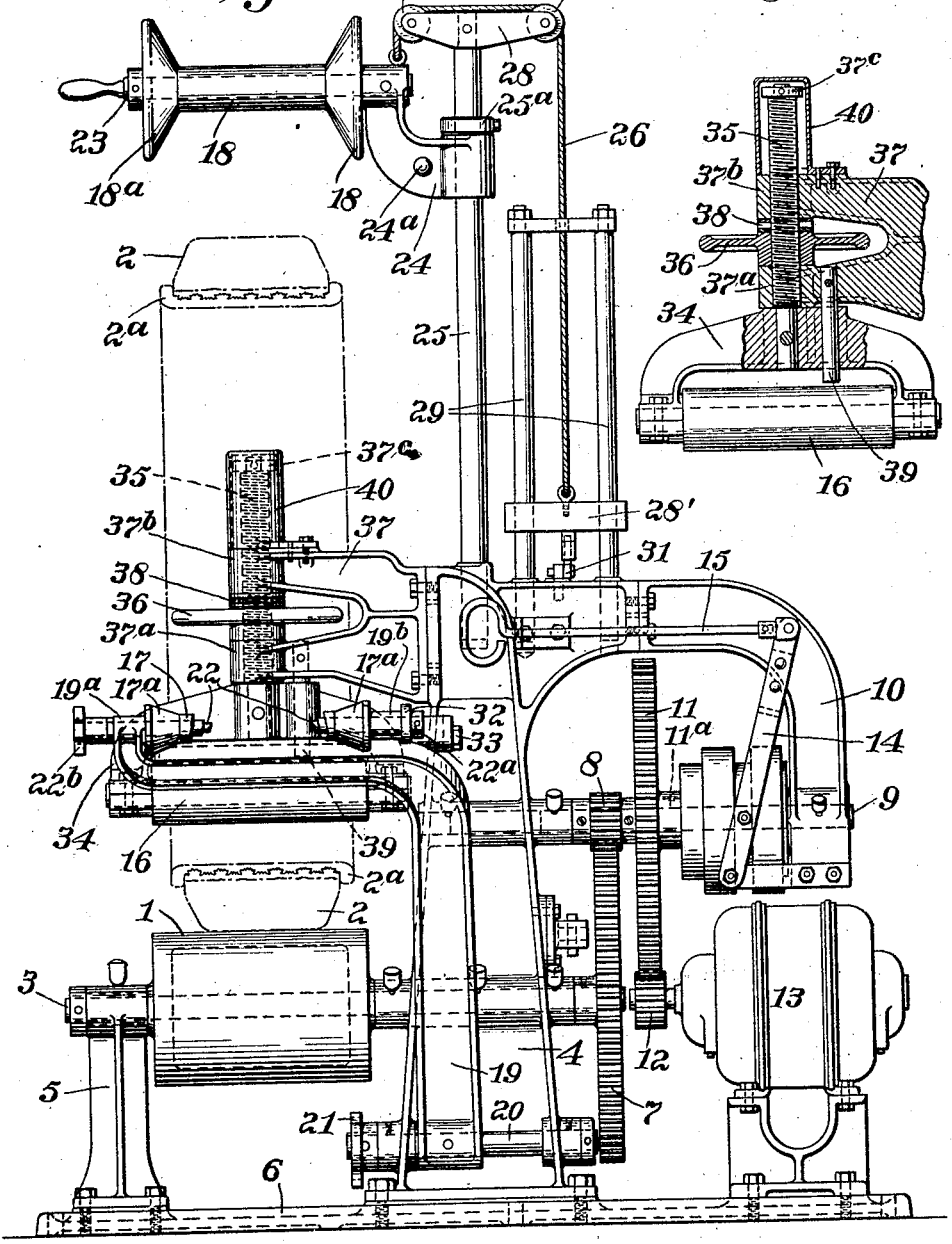

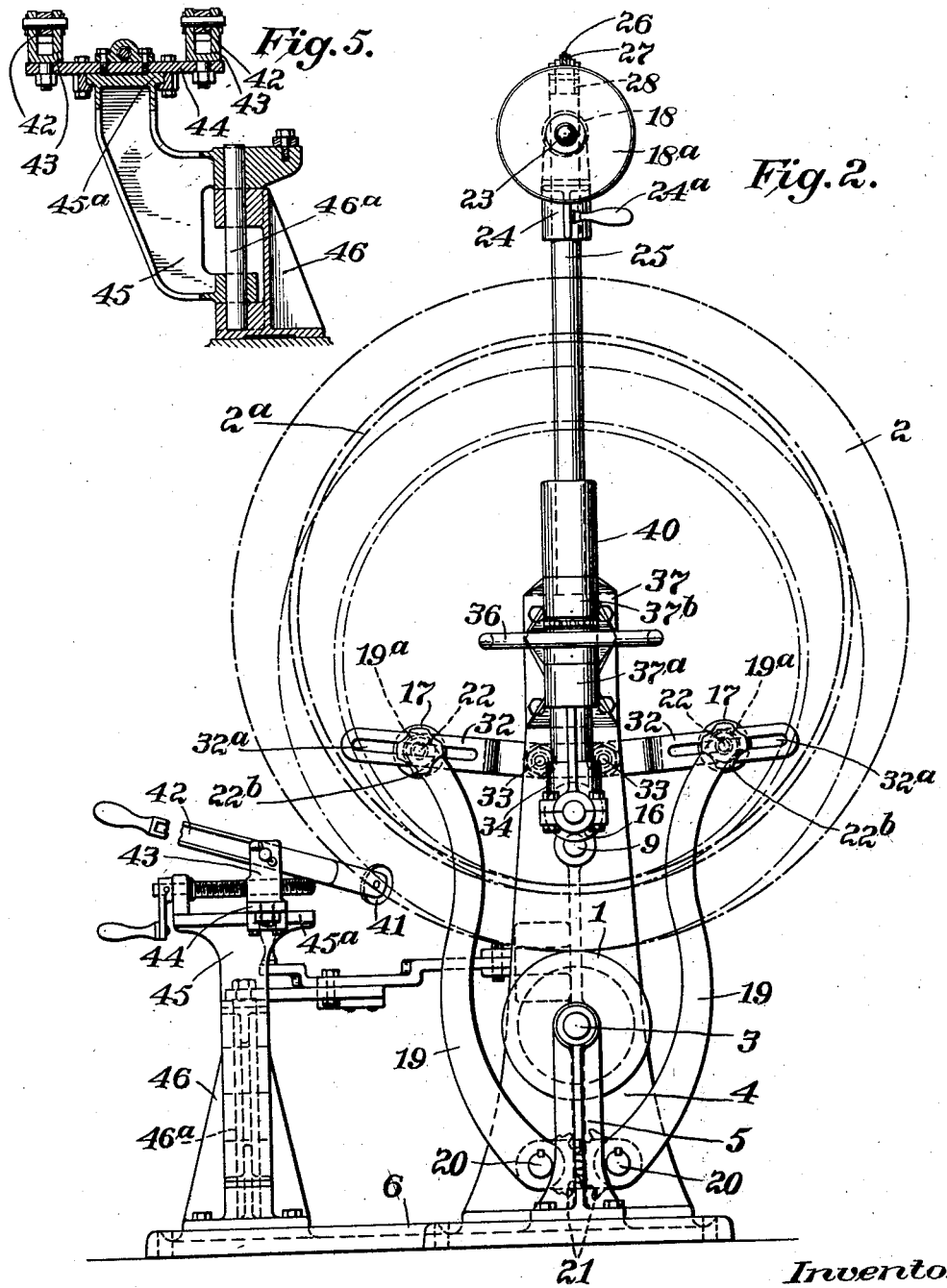

Patented Mar. 31, 1925.

1,531,435

UNITED STATES PATENT OFFICE.

FRED D. FOWLER, OF WATERTOWN, MASSACHUSETTS, ASSIGNOR TO HOOD RUBBER COMPANY, OF WATERTOWN, MASSACHUSETTS, A CORPORATION OF MASSACHUSETTS.

TREAD-APPLYING MACHINE FOR SOLID TIRES.

Application filed November 21, 1923. Serial No. 676,148.

*To all whom it may concern:*

Be it known that I, FRED D. FOWLER, a citizen of the United States, and resident of Watertown, in the county of Middlesex and State of Massachusetts, have invented certain new and useful Improvements in Tread-Applying Machines for Solid Tires, of which the following is a specification.

In the manufacture of cushion tires for trucks and like heavy motor vehicles, it is customary to produce a cushion strip of soft rubber by the use of an extruding machine having a die opening of a shape corresponding to the cross section of the cushion strip, and to thereafter apply it to a carrying rim having a surfacing of hard rubber forming a base to which the soft rubber strip is united during the subsequent vulcanization.

My present invention aims to provide a simple, economical and durable machine by which the cushion tire strip or band may be rapidly pressed into intimate contact with all parts of the hard rubber base, and the invention comprises the novel features of construction and arrangement of parts hereinafter described, the precise nature and scope of my invention being defined and ascertained by the appended claims.

An embodiment of my invention is illustrated in the accompanying drawings, in which:—

Figure 1 is an elevation of the machine as viewed from the right, Fig. 2, no attempt being made to show therein the stitcher arms and their support, to avoid confusion.

Fig. 2 is an elevation as viewed from the left, Fig. 1, the parts in rear of the standard being omitted from this view for clearness.

Fig. 3 is a sectional plan view.

Fig. 4 is a sectional detail of the presser roller, and

Fig. 5 is a sectional detail of the shifting table or support on a reduced scale.

Referring by reference characters to these drawings, the numeral 1 designates a supporting and driving drum upon which the cushion tire 2 rests after it has been applied to its carrying rim (indicated at $2^a$).

This drum is fast on a shaft 3 journaled in suitable standards 4 and 5 supported by the base 6, the standard 4 being in the nature of a column supporting other parts as hereinafter described.

Shaft 3 may be driven in any desired manner, but my preferred manner of accomplishing this is that shown in the drawings, in which a spur gear 7 fast thereon, meshes with a spur gear 8 fast on a counter shaft 9 journaled in suitable bearings in the column and depending end of a downwardly curved bracket arm 10 respectively. A spur gear 11 carried by a sleeve $11^a$ rotatably mounted on the counter shaft meshes with a pinion 12 on the shaft of a prime mover such as an electric motor 13.

Means are provided for connecting the sleeve $11^a$ with the counter shaft which may conveniently take the form of a "Johnson" friction clutch provided with a shipping lever 14 having an operating handle 15 extending forward to within convenient reach of the operator.

The tire is supported on and rotated by frictional contact with the drum 1 against which it is pressed with the requisite pressure to cause the inner surface of the cushion strip to be forced into intimate contact with the hard base by a presser roll 16, being guided in its rotary movement by a pair of lower or side rolls 17 and an upper guide roll 18. These guide rolls are of substantially spool shape, having cylindrical body portions and truncated cone-shaped, or flared heads. The guide rolls 17 are designed to engage with the inner face of the metal carrying band or rim, to maintain the same in a vertical plane, the heads $17^a$ thereof overlapping said edges of the rim. The guide 18 is designed to bear against the outer surface of the cushion strip and its conical ends or heads $18^a$ have their surfaces flared or inclined a degree to conform substantially to the side edges of the cushion strip.

These several guide rolls are movably mounted so that they can be properly positioned to allow the placing in position of the tire to be rolled and thereafter moved into engagement to maintain it, the presser roll being likewise movably mounted for this purpose. These movable mountings also enable tires of different diameter to be rolled in the same machine, as indicated by the dotted lines in Fig. 2.

The rolls 17 are journaled in guide roll arms 19 which are carried by shafts 20, being rigidly attached to said shafts, and the shafts in turn being provided with intermeshing gear segments 21 which cause the arms to move in unison. These arms are located adjacent the column or standard 4 and hence in rear of the roll 1, and they have angularly extended upper ends provided with upwardly projecting bearing members 19$^a$ and 19$^b$ to receive the shafts or rods 22 on which the rolls 17 are mounted, this arrangement coupled with the manner in which the presser roll is mounted, as hereinafter described, affording an open space at one side, left of Fig. 1, for the free lateral insertion of the rim and tire between the drum 1 and guide rolls 17 and presser roll 16.

In Figs. 1 and 2 the presser roll 16 being elevated, rolls 17 being positioned inwardly to clear the rim, and roll 18 being elevated, the first step towards holding the rim in position is to lower the roll 18 into contact with the cushion tire. To this end the said guide roll 18 is journaled on a shaft 23 carried by a bracket 24 which is slidably mounted on a vertical guide roll post 25 and which is counter-balanced by a flexible element such as a wire rope 26 which passes over guide pulleys 27 supported by a pulley bracket 28 carried at the top of the post 25, the other end of the rope 26 being connected to a counterweight 28' slidably guided by posts or guides 29 supported from the column or standard 4. The bracket 24 is provided with a handle 24$^a$ adapted to be grasped by the operator for raising and lowering the bracket, and an adjustable stop collar 25$^a$ is provided on the post 25 for limiting the upward movement of the bracket. The relative weight of the parts is preferably such that the guide roll tends to descend by gravity when free to do so, and to retain it in an elevated position when raised by the operator, I provide a latch of any convenient form, as indicated at 31. The rim and tire having been positioned, as shown in Figs. 1 and 2, and the upper guide roll 18 having been lowered into engagement with the tire tread by the release of the latch, the next operation is to bring the guide rolls 17 into contact with the inner face of the rim and to hold them in this position. To this end the shafts or rods 22 are made capable of sliding or endwise movement relative to the rolls 17 and bearings 19$^a$ and 19$^b$, and each rod is provided with a head 22$^a$ and a clamp nut 22$^b$ threaded on its opposite end and having a head of knurled or non-circular shape to enable it to be grasped by the operator and turned in the proper direction to secure a clamping effect, or to release it. Between the headed end 22$^a$ of the rod, and the bearing 19$^b$ of each roll, is located a clamp bar 32 which has a slot 32$^a$ through which the clamp rod 22 passes. These clamp bars extend toward and are pivotally connected to the supporting standard or column, by clamp bar pivots, or bolts 33. With the clamp nuts 22$^b$ loosened, the arms 19 may be readily swung apart by the operator, using the clamp nuts 22$^b$ as handles, until the rolls 17 contact with the inner face of the rim, and by reason of the fact that the arms are geared together by the segments 21 and hence obliged to move in unison, it will be seen that the rim and tire will be held with its axis directly in line with the axes of the supporting drum and the upper guide roll 18. Thereafter the presser roll 16 is lowered into contact with the rim and forced there-against with sufficient force to give the desired pressure to the cushion strip or tread during the rolling operation.

To enable the presser roll to be thus moved while not interfering with the entry and removal of the tire, as aforesaid, it is journaled in a yoke 34 which is carried at the lower end of a screw threaded rod 35, which rod may be termed an elevating screw although it has no rotary motion. Vertical movement of the elevating screw or rod is effected by a hand wheel 36 which has an internally threaded hub which engages the elevating screw, the hub being located between the arms of a forked bracket 37 supported by the main standard, these arms having tubular portions 37$^a$ and 37$^b$, through which the elevating rod or screw passes, there being preferably an anti-friction thrust bearing 38 located between the hand wheel hub and the member 37$^b$. Rotary motion of the yoke during its rectilinear vertical motion is prevented by a guide 39 in the shape of a pin or post depending from the bracket 37 and slidably engaging an opening in the yoke.

The portion of the elevating rod or screw above the bearing bracket, is preferably enclosed by a dust cap 40 and the elevating screw is provided at its upper end with a stop collar 37$^c$ for limiting its downward movement.

For pressing or stitching the edges of the tire down onto the rim, I provide stitcher wheels or discs 41 which are journaled on horizontal pivots in the forked ends of lever arms 42 pivoted on horizontal pivot pins in the bifurcated upper ends of posts or brackets 43. These posts have reduced cylindrical lower ends rotatably held in recesses in a cross bar or slide member 44, slidably carried by a suitable guideway 45$^a$ on a swing-table 45, which swing-table is pivotally supported by the standard 46 to which it is articulated by hinge rod 46ª.

Having thus described my invention, what I claim is:—

1. In apparatus for the purpose described, in combination, a single roller or drum adapted to support a rim or band with a tire forming strip thereon, means for rotating said roller, guiding means for holding the rim in a vertical plane above said drum, a pressure roll for applying pressure to the inner face of the rim adjacent the point of contact with the drum, and a pair of stitcher rolls located beneath the rim at one side of said supporting roller and having means whereby they may be pressed upwardly against the tire.

2. In apparatus for the purpose described, in combination, a single roller or drum adapted to support a rim or band with an annular tire strip thereon, a pressure roller for acting on the inner surface of the rim adjacent the point of contact with the drum, and a pair of flanged guide rollers for contacting with the inner surface of the rim at points on opposite sides of a line passing through said drum and the axis of the rim, means for moving the guide rollers into and out of engagement with the rim, and a pair of stitcher rolls located substantially below one of said flanged guide rollers when in rim engaging position, and provided with means whereby they may be pressed towards said guide roller.

3. In apparatus for the purpose described, a single roller or drum adapted to support a rim or band with a tire forming strip thereon, means for rotating said roller, guiding means for holding the rim in a vertical plane above said drum, a presser roll for applying pressure to the inner face of the rim adjacent the point of contact with the drum, and a pair of hand levers mounted to swing about vertical and horizontal axes on a fixed support, and having ends adapted to be positioned beneath the tire, and stitcher rolls carried by said ends.

4. In apparatus for the purpose described, a single roller or drum adapted to support a rim or band with a tire forming strip thereon, means for rotating said roller, guiding means for holding the rim in a vertical plane above said drum, a pressure roll for applying pressure to the inner face of the rim adjacent the point of contact with the drum, a swing table, a pair of brackets pivotally supported on said swing table to swing about vertical axes, a pair of hand levers of the first order mounted on said brackets to swing about horizontal axes, and stitcher rolls carried by the ends of said hand levers.

5. In combination a roller or drum adapted to support a tire rim or band with an annular tire strip thereon, means for rotating said drum, a pressure roller for acting on the inner surface of the rim adjacent the point of contact with the drum, a pair of swinging arms, means for causing said arms to move in unison, flanged guide rolls carried by the free ends of said arms for engaging the inner surface of the rim, and means for locking said arms with the guide rolls in rim engaging position.

6. In combination a supporting roller or drum adapted to support a tire rim or band with an annular tire strip thereon, pressure means adapted to coact with the inner surface of the rim adjacent the point of contact with the drum, a pair of swinging arms provided with flanged rollers at their upper ends, adapted to engage the inner surface of the rim on opposite sides of said pressure means, shafts supporting said arms, and gearing between said shafts and causing them to rotate in unison.

7. In combination a supporting drum or roller adapted to support a tire rim or band with an annular tire strip thereon, a pressure roller for acting on the inner surface of the rim adjacent the point of contact with the drum, a pair of arms located on one side of the supporting drum and having laterally extending portions for projecting within the rim, rim engaging guide rollers carried by said laterally projecting portions, and means for causing said arms to move in unison.

8. In combination, a supporting roller or drum adapted to support a rim or band with an annular tire strip thereon, means for rotating said drum, guiding means for maintaining a rim in vertical position above said drum, a standard located adjacent one end of the drum and having a part projecting horizontally into a position above the drum, a rod or shaft supported by said bracket to have vertical movement therein, a yoke, a presser roller journaled in the lower end of said yoke, and means for imparting vertical movement to said rod or shaft.

9. In combination, a roller or drum adapted to support a rim or band with an annular tire strip thereon, means for driving said drum, a standard located at one end of said drum and having a bifurcated part projecting laterally into a position vertically above said drum, a vertically disposed threaded shaft mounted to have rectilinear movement in said bifurcated portion, a yoke carried at the lower end of said rod or shaft, a presser roller journaled in said yoke, and a hand wheel having an internally threaded hub in engagement with said screw threaded shaft in the bifurcation of said standard portion.

10. In combination, a supporting roller or drum with means for rotating the same, a standard at one end of said drum having a part projecting horizontally therefrom into a position above said drum, a vertically movable presser roller supported from said horizontally projecting part with means for moving it vertically towards and from the drum, a pair of arms pivoted adjacent said standard and having portions projecting horizontally above the drum, flanged guide rollers carried by said projecting parts for engaging the inner surface of the rim, and clamp bars for adjustably connecting said arms with the standard.

In testimony whereof, I affix my signature.

FRED D. FOWLER.